(12) United States Patent
Wang et al.

(10) Patent No.: US 12,309,537 B2
(45) Date of Patent: May 20, 2025

(54) ASSEMBLIES AND METHODS FOR MANAGING SPECTRAL HOLE BURNING

(71) Applicant: HUAWEI TECHNOLOGIES CO., LTD., Guangdong (CN)

(72) Inventors: Lixian Wang, Quebec (CA); Zhiping Jiang, Kanata (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/956,900

(22) Filed: Sep. 30, 2022

(65) Prior Publication Data

US 2024/0114270 A1 Apr. 4, 2024

(51) Int. Cl.
*H04Q 11/00* (2006.01)

(52) U.S. Cl.
CPC . *H04Q 11/0005* (2013.01); *H04Q 2011/0009* (2013.01); *H04Q 2011/0016* (2013.01)

(58) Field of Classification Search
CPC ........... H04Q 11/005; H04Q 2011/009; H04Q 2011/0016
USPC .......................................................... 398/48
See application file for complete search history.

(56) References Cited

U.S. PATENT DOCUMENTS

| | | | |
|---|---|---|---|
| 6,366,393 B1 * | 4/2002 | Feulner | H01S 3/1301 359/337 |
| 6,731,424 B1 * | 5/2004 | Wu | H04B 10/2941 359/344 |
| 7,365,903 B2 * | 4/2008 | Choi | H01S 3/06758 359/337.4 |
| 8,995,048 B2 * | 3/2015 | Bolshtyansky | H01S 3/13013 359/341.1 |
| 10,003,429 B2 * | 6/2018 | Tsuzuki | H04B 10/07955 |
| 2002/0171917 A1 * | 11/2002 | Lelic | H04B 10/2931 359/341.4 |

(Continued)

FOREIGN PATENT DOCUMENTS

| CN | 101053187 A | * 10/2007 | ......... H01S 3/06758 |
|---|---|---|---|
| CN | 113851915 A | * 12/2021 | |

(Continued)

OTHER PUBLICATIONS

Liaw et al; Dynamic Power-Equalized EDFA Module Based on Strain Tunable Fiber Bragg Gratings ; Jul. 1999 ; IEEE Photonics Technology Letters; vol. 11, No. 7; pp. 1-3. (Year: 1999).*

(Continued)

*Primary Examiner* — Amritbir K Sandhu
(74) *Attorney, Agent, or Firm* — BCF LLP (57) ABSTRACT

System and method for managing spectral hole burning (SHB) effect in an optical transport network (OTN) link. The method is performed by an automatic gain control (AGC) circuit of an amplification assembly of the OTN link. The method comprises determining, via a first photodetector communicatively connected to the AGC circuit, an input power of an income signal and, in response to the input power being less than a predetermined portion of a full-loading signal power, causing a pump power variable attenuator (PVOA) of the amplification assembly to attenuate pump power from a pump source, the PVOA being disposed optically intermediate a first doped fiber and a second doped fiber of the amplification assembly.

17 Claims, 10 Drawing Sheets

(56) References Cited

U.S. PATENT DOCUMENTS

| | | | |
|---|---|---|---|
| 2003/0035206 A1* | 2/2003 | Pavel | H04B 10/296 359/341.4 |
| 2003/0081892 A1* | 5/2003 | Ghera | H01S 3/06758 359/341.1 |
| 2005/0094254 A1* | 5/2005 | Mongardien | H01S 3/13013 359/337.4 |
| 2005/0116247 A1* | 6/2005 | Canham | C04B 37/003 228/262.1 |
| 2005/0146782 A1* | 7/2005 | Takeyama | H01S 3/06758 359/337.1 |
| 2006/0056011 A1* | 3/2006 | Iizuka | H01S 3/13013 359/337 |
| 2011/0199672 A1* | 8/2011 | Takeyama | H04B 10/2941 359/337 |
| 2016/0056011 A1* | 2/2016 | Khursheed | H01J 37/153 250/396 ML |
| 2016/0315708 A1* | 10/2016 | Kachita | H04B 10/2942 |
| 2020/0228227 A1* | 7/2020 | Boertjes | H04J 14/02212 |

FOREIGN PATENT DOCUMENTS

| | | | | |
|---|---|---|---|---|
| EP | 1557916 A1 * | 7/2005 | | H01S 3/06754 |
| JP | 2004070166 A * | 3/2004 | | |
| JP | 2009145732 A * | 7/2009 | | |
| KR | 102197131 B1 * | 12/2020 | | |
| WO | WO-2007025929 A1 * | 3/2007 | | H04B 10/296 |

OTHER PUBLICATIONS

Wang et al; Broadband silica-based thulium doped fiber amplifier employing multi-wavelength pumping ; Oct. 2016; Optics Express; pp. 1-8. (Year: 2016).*

X. Zhou, M. Feuer, and M. Birk, "Fast control of inter-channel SRS and residual EDFA transients using a multiple-wavelength forward-pumped discrete Raman amplifier," in Optical Fiber Communication Conference and Exposition and The National Fiber Optic Engineers Conference (2007), paper OMN4, Mar. 2007, p. OMN4.

K. Maru, K. Tanaka, T. Chiba, H. Nonen, and H. Uetsuka, "Dynamic Gain Equalizer Using Proposed Adjustment Procedure for Thermooptic Phase Shifters Under the Influence of Thermal Crosstalk," J. Lightwave Technol., JLT, vol. 22, No. 6, p. 1523, Jun. 2004.

* cited by examiner

ASSEMBLIES AND METHODS FOR MANAGING SPECTRAL HOLE BURNING

CROSS-REFERENCE TO RELATED APPLICATIONS

This is the first application filed for the instantly disclosed technology.

FIELD OF THE TECHNOLOGY

The present disclosure generally relates to the field of optical communication networks and, in particular, to methods and systems for reducing spectral hole burning (SHB) effect in optical amplifiers of optical transport network (OTN) link.

BACKGROUND

Typical implementation of optical networks, such as, for example, dense wavelength division multiplex (DWDM) networks, relies on optical amplifiers such as Erbium doped fiber amplifiers (EDFAs) to provide optical gain in order to compensate insertion losses induced along an optical transport network (OTN) link. Optical amplifiers are usually expected to provide a "stiff" optical gain to the optical signal carried by the channels of the OTN link. More specifically, the optical gain is expected to be independent from the operation conditions of the OTN link such as channel input powers and channel allocations.

However, under different operation conditions, gain shape deformations may occur. This phenomenon is sometimes due to the so-called spectral hole burning (SHB) effect. The SHB-induced gain shape deformation causes some signal channels to fail, leading to a delay of service recovery (network reconfiguration) and additional costs.

To this end, there remains an interest in being able to provide an optical amplifier that provides a gain substantially independent from operation conditions of the OTN link and/or that alleviates drawbacks of the SHB effect.

SUMMARY

By way of introduction, an object of the present disclosure (that is, one general purpose of this disclosure) is to provide a method and system for improving transmission of an optical signal along an optical transport network (OTN) link by alleviating drawbacks of the spectral hole burning (SHB) effect in optical amplifiers of the OTN link. In Erbium doped fiber amplifiers, the SHB effect is due to the light emission center of the Erbium doped fiber (EDF) (i.e. the $Er^{3+}$ ions) being located in amorphous silica glass matrix of the fiber where Er3+ ion's local electro-magnetic fields change from site to site. Since Er3+ ions' stark splitting is impacted by the local fields, they may have different spectroscopic properties. The measured gain profile of an EDFA is in fact a weighted summation of those provided by different Er3+ ions. When the operation condition of the OTN link changes, some $Er^{3+}$ ions are depleted more than the others, resulting in a deformation of the overall gain shape of the optical amplifier.

Optical amplifiers are typically designed to provide flat/identical gain over the wavelength range of the optical signal when every channel of the OTN link carries a portion of the optical signal. This may be referred to as a full-loading operating condition of the channels of the OTN link at the optical amplifier. Upon operating in a few-channel-loading condition (i.e. one or more channels do not carry any signal), the gain spectrum of the optical amplifier may be modified and not be flat any more due to the SHB effect that happens in the optical amplifier. It can be said that under the few-channel loading condition, the gain shape has a "hole-like" deformation in the vicinity of the wavelength positions of the input signal channels. As a result, accumulated gain for some of the channels may be insufficient to compensate for the OTN link loss. Optical powers of those channels may fall out of the receivable range resulting in the transmission of the signal along those channels failing.

In order to alleviate drawbacks of the spectral hole burning (SHB) effect in optical amplifiers of the OTN link, input power at an optical amplifier of the OTN link is determined and, in response to the input power being less than a predetermined portion of a full-loading signal power, a pump power variable attenuator (PVOA) of the amplification assembly is caused to attenuate pump power from a diode pump of the optical amplifier. The PVOA is disposed optically intermediate a first erbium doped fiber and a second erbium doped fiber. It can be said that, by proper amplifier design, the present technology uses an "inverse SHB" effect in some sections of the erbium doped fiber along the optical amplifier to counteract the SHB effect occurring in other sections of the optical amplifier. In the context of the present disclosure, the inverse SHB effect refers to the physics phenomenon which happens in the region where the optical signals "see" loss in the optical amplifier. Under the few-channel loading condition and when the optical signal "sees" loss, the optical gain shape presents an inversed "hole-like" deformation, which happens at the same wavelength positions of the signal channels that are present in the optical amplifier. By utilizing said inverse SHB effect, the overall SHB-induced gain shape deformation can be substantially alleviated.

According to one aspect of the present technology, there is provided an amplification assembly for an optical transport network (OTN) link, the amplification assembly comprising an automatic gain control (AGC) circuit, a first signal splitter configured for receiving an input wavelength division multiplexing (WDM) signal, a first photodetector optically connected to a first output of the first signal splitter, the first photodetector being communicatively connected to the AGC circuit, the AGC circuit and the first photodetector being configured to determine an input signal power, a first amplifier stage assembly optically connected to a second output of the first signal splitter, the first amplifier stage assembly being communicatively connected to the AGC circuit, at least one signal variable optical attenuator (VOA) optically connected to the first amplifier stage, at least one gain flattening filter (GFF) optically connected to the at least one signal VOA, a second amplifier stage assembly optically connected to the at least one GFF, the second amplifier stage assembly being communicatively connected to the AGC circuit, a second signal splitter optically connected to the second amplifier stage assembly, the second signal splitter being configured for transmitting an output WDM signal from a first output of the second signal splitter; and a second photodetector optically connected to a second output of the second signal splitter, the second photodetector being communicatively connected to the AGC circuit, the AGC circuit and the second photodetector being configured to determine an output signal power. At least one of the first amplifier stage assembly and the second amplifier stage assembly comprises a first doped fiber, a pump power variable attenuator (PVOA) optically connected to the first doped fiber, a second doped fiber optically connected to the PVOA and a pump source optically connected to the first doped fiber and the second doped fiber. The PVOA is configured to manage pump illumination provided to the second doped fiber from the pump source.

In some embodiments of the amplification assembly, the first and second doped fibers are Erbium doped fibers.

In some embodiments of the amplification assembly, the PVOA of the at least one of the first amplifier stage assembly and the second amplifier stage assembly comprises a first wavelength division multiplexing (WDM) coupler, a variable optical attenuator (VOA) optically connected to the first WDM coupler, the VOA being communicatively connected to the AGC circuit and a second WDM coupler optically connected to the VOA.

In some embodiments of the amplification assembly, the PVOA of the at least one of the first amplifier stage assembly and the second amplifier stage assembly comprises a first wavelength division multiplexing (WDM) coupler, an optical switch (SW) optically connected to the first WDM coupler, the optical switch being communicatively connected to the AGC circuit and a second WDM coupler optically connected to the SW.

In some embodiments of the amplification assembly, the PVOA of the at least one of the first amplifier stage assembly and the second amplifier stage assembly comprises a tilted fiber Bragg grating (TFBG) operatively connected to the AGC circuit.

In some embodiments of the amplification assembly, the PVOA of the at least one of the first amplifier stage assembly and the second amplifier stage assembly comprises a fiber Bragg grating (FBG) operatively connected to the AGC circuit, a center wavelength of the FBG being electrically tunable.

In some embodiments of the amplification assembly, an other one of the first amplifier stage assembly and the second amplifier stage assembly comprises a third doped fiber, an other pump power variable attenuator (PVOA) optically connected to the third doped fiber, a fourth doped fiber optically connected to the other PVOA and an other pump source optically connected to the third doped fiber and the fourth doped fiber. The other PVOA is configured to manage pump illumination provided to the second doped fiber from the pump source.

In some embodiments of the amplification assembly, the third and fourth doped fibers are Erbium doped fibers.

According to another aspect of the present technology, there is provided a method for managing spectral hole burning (SHB) effect in an optical transport network (OTN) link, the method being performed by an automatic gain control (AGC) circuit of an amplification assembly. The method comprises determining, via a first photodetector communicatively connected to the AGC circuit, an input power of an income signal and, in response to the input power being less than a predetermined portion of a full-loading signal power, causing a pump power variable attenuator (PVOA) of the amplification assembly to attenuate pump power from a pump source, the PVOA being disposed optically intermediate a first doped fiber and a second doped fiber.

In some embodiments of the method, the first and second doped fibers are Erbium doped fibers.

In some embodiments of the method, the predetermined portion of the full-loading signal power is half of the full-loading signal power.

In some embodiments of the method, the method further comprises determining, via a second photodetector communicatively connected to the AGC circuit, an output power of an output signal and controlling, based at least in part on the output power of the output signal, a driving current of the pump source to manage an average gain level of the amplification assembly.

In some embodiments of the method, causing a pump power variable attenuator (PVOA) of the amplification assembly to attenuate pump power from a pump source comprises operating a variable optical attenuator optically intermediate two wavelength division multiplexing (WDM) couplers.

In some embodiments of the method, causing a pump power variable attenuator (PVOA) of the amplification assembly to attenuate pump power from a pump source comprises actuating an optical switch optically intermediate two wavelength division multiplexing (WDM) couplers.

In some embodiments of the method, causing a pump power variable attenuator (PVOA) of the amplification assembly to attenuate pump power from a pump source comprises applying an electrical current to a tilted fiber Bragg grating (TFBG) optically intermediate the first and second doped fibers.

In some embodiments of the method, causing a pump power variable attenuator (PVOA) of the amplification assembly to attenuate pump power from a pump source comprises applying an electrical current to a fiber Bragg grating (FBG) optically intermediate the first and second doped fibers.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is only intended to describe particular representative implementations or embodiments and is not intended to be limiting of the present technology. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that, although the terms first, second, third, etc. may be used herein to describe various elements, these elements should not be limited by these terms. These terms are used to distinguish one element from another. Thus, a first element discussed below could be termed a second element without departing from the teachings of the present technology. As used herein, the term "and/or" includes any and all combinations of one or more of the associated listed items.

Moreover, all statements herein reciting principles, aspects, embodiments and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology.

Similarly, it will be appreciated that any flowcharts, flow diagrams, state transition diagrams, pseudo-code, and the like represent various processes which may be substantially represented in computer-readable media and so executed by a computer or processor, whether or not such computer or processor is explicitly shown.

The functions of the various elements shown in the figures, including any functional block labeled as a "controller", "processor" or "processing unit", may be provided through the use of dedicated hardware as well as hardware capable of executing software in association with appropriate software and according to the methods described herein. When provided by a processor, the functions may be provided by a single dedicated processor, by a single shared processor, or by a plurality of individual processors, some of which may be shared. In some embodiments or implementations of the present technology, the processor may be a general-purpose processor, such as a central processing unit (CPU) or a processor dedicated to a specific purpose, such as a digital signal processor (DSP). Moreover, explicit use of the term a "processor" should not be construed to refer exclusively to hardware capable of executing software, and may implicitly include, without limitation, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules or units which are implied to be software, may be represented herein as any combination of flowchart elements or other elements indicating performance of process steps and/or textual description. Such modules may be executed by hardware that is expressly or implicitly shown, the hardware being adapted to (made to, designed to, or configured to) execute the modules. Moreover, it should be understood that module may include for example, but without being limitative, computer program logic, computer program instructions, software, stack, firmware, hardware circuitry or a combination thereof which provides the required capabilities.

BRIEF DESCRIPTION OF THE FIGURES

The features and advantages of the present disclosure will become apparent from the following detailed description, taken in combination with the appended drawings, in which.

It is to be understood that throughout the appended drawings and corresponding descriptions, like features are identified by like reference characters. Furthermore, it is also to be understood that the drawings and ensuing descriptions are intended for illustrative purposes only and that such disclosures are not intended to limit the scope of the claims.

DETAILED DESCRIPTION

Various representative implementations and embodiments of the described technology will be described more fully hereinafter with reference to the accompanying drawings, in which representative implementations and embodiments are shown. The present technology concept may, however, be embodied in many different forms and should not be construed as limited to the representative implementations and embodiments set forth herein. Rather, these representative implementations and embodiments are provided so that the disclosure will be thorough and complete, and will fully convey the scope of the present technology to those skilled in the art. In the drawings, the sizes and relative sizes of layers and regions may be exaggerated for clarity. Like numerals refer to like elements throughout.

Figure 1:
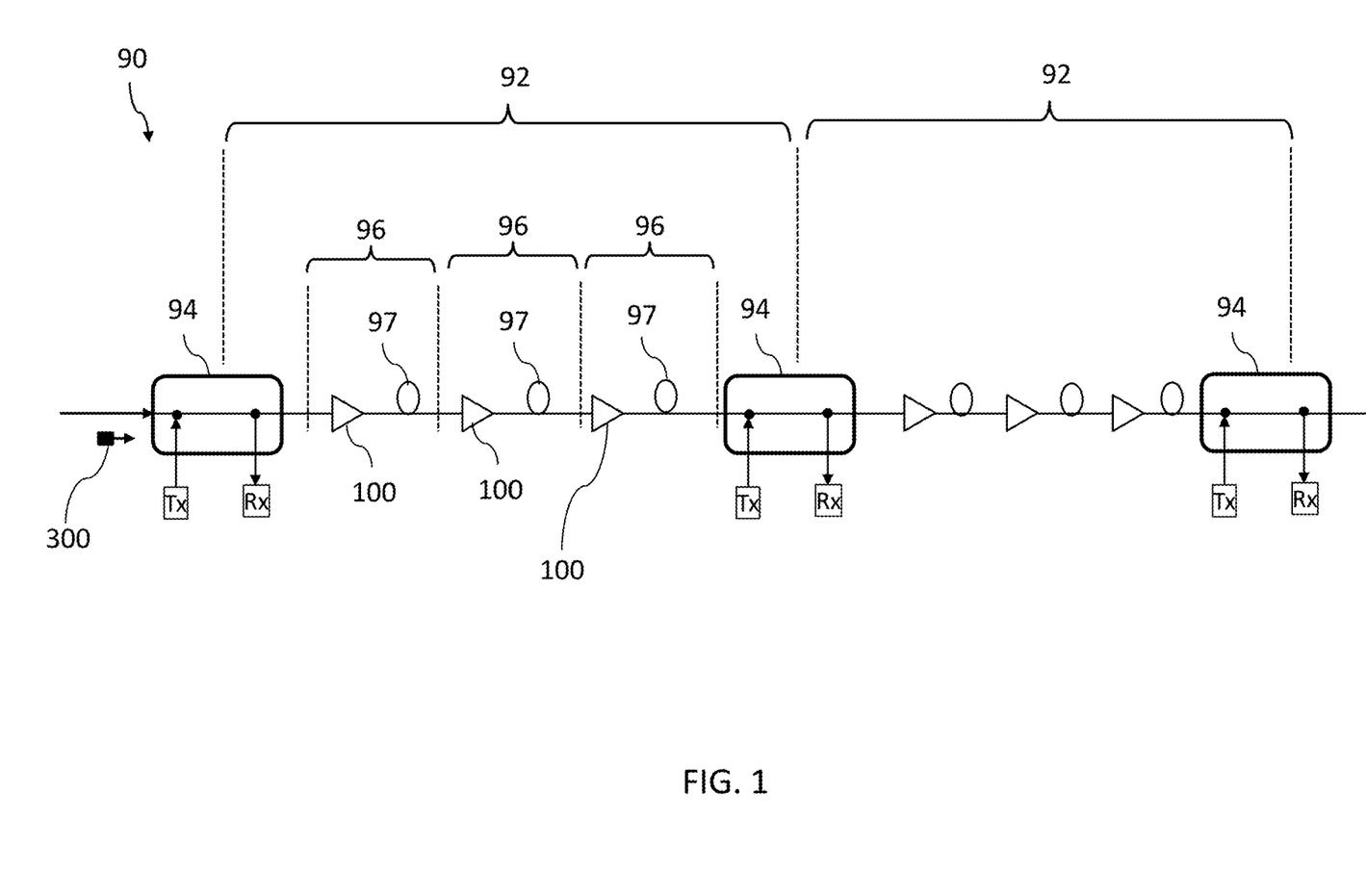
FIG. 1 is a high-level diagram of an optical transport network (OTN) link in accordance with some embodiments of the present technology.

Referring now to the drawings, FIG. 1 depicts a conceptual diagram of an optical transport network (OTN) link 90 that may be addressed by the systems and methods presented herein. As shown, the OTN link 90 typically includes a plurality of optical multiplexing sections (OMSs) 92 for transmitting an optical signal 300. The OTN link 90 may include a conventional optical fiber such as, for example, a glass fiber surrounded by one or more coating layers. The OTN link 90 may include an optical fiber core which transmits the optical signal 300, and an optical cladding, which confines the optical signal within the optical fiber core. It is also contemplated that light emitted by the transmitting device 110, thereby defining the optical signal 300, may be single polarized, dual polarized, or randomly polarized, may have a particular polarization (e.g. linearly polarized, elliptically polarized, or circularly polarized). In this implementation, a wavelength of the optical signal 300 can be located in one or multiple of the following bands: E-band (14001470 nm), S-band (14701520 nm), C-band (15201565 nm), L-band (15651630 nm), and U-band (1630 nm-1680 nm) bands.

Each OMS 92 includes optical add-drop multiplexers, such as, for example, a reconfigurable optical add-drop multiplexers (ROADMs) 94 each containing at least one wavelength selective switch (not shown). The ROADMs 94 may include transmitters, denoted "Tx", and receivers, denoted "Rx", to respectively add and drop a given signal from the optical signal 300. Each OMS 92 may then be configured to add, remove, and/or reroute a wavelength of the optical signal 300, via the ROADMs 94. For example and without limitation, each transmitter Tx may be a laser source of a respective wavelength and communicatively connected to a corresponding processing unit (not shown) of the ROADM 94. The laser source may be configured to produce, emit, or radiate pulses of light with certain pulse duration. In certain implementations, one or more transmitters Tx implemented as pulsed laser light sources may include one or more laser diodes, such as but not limited to, Fabry-Perot laser diode, a quantum well laser, a distributed Bragg reflector (DBR) laser, a distributed feedback (DFB) laser, or a vertical-cavity surface-emitting laser (VCSEL). Just as examples, a given laser diode may be an aluminum-gallium-arsenide (AlGaAs) laser diode, an indium-gallium-arsenide (InGaAs) laser diode, or an indium-gallium-arsenide-phosphide (InGaAsP) laser diode, or any other suitable laser diode. The ROADM 94 may be a passive multiplexer such as, without limitation, a prism-based or a mirror-based multiplexer, or an active multiplexer based on a combination of passive components and tunable detectors, each detector being tuned to a specific frequency. Each OMS 92 is formed from multiple optical transport sections (OTSs) 96, where at each OTS 96 the wavelength remains same.

It is noted that the OTN link 90 may incorporate additional optical elements, which may include either or both of active and passive elements/modules, including but not limited to: optical amplifiers, optical filters, wavelength selective switches, arrayed waveguide gratings, optical transmitters, optical receivers, processors and other suitable components. However, for purposes of simplicity, these elements have been omitted from FIG. 1.

Each optical transport section 96, also referred to as a link 96, includes an optical amplifier (e.g., erbium-doped fiber amplifiers (EDFAs)) and a length of fiber 97. The optical fiber may be of any suitable type such as, for example, single mode optical fiber, multi-mode optical fiber, standard single mode fibers (SSMFs), large effective area fibers (LEAFs) or the like. The optical amplifier of the link 96 could include various amplifiers placed in a sequence for amplifying the optical signal along the OTN link 105. According to non-limiting implementations of the present technology, the amplifier of at least one of the OTSs 96 is an optical amplification assembly 100.

Figure 2:
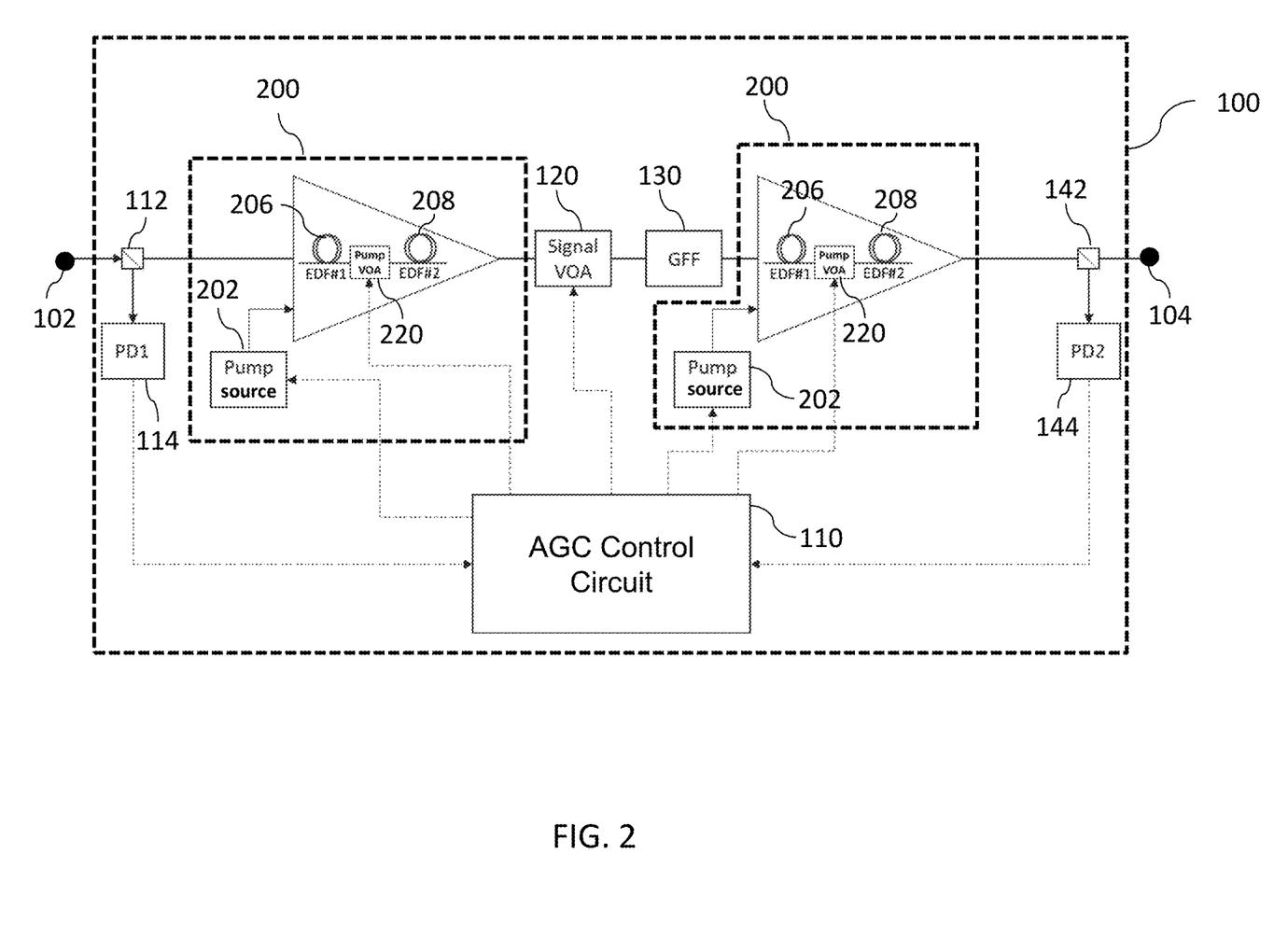
FIG. 2 is a high-level diagram of an optical amplification assembly in the OTN link of FIG. 1.

With reference to FIG. 2, the amplification assembly 100 of one of the OTSs 96 is illustrated in more detail. While only one assembly 100 is described herein, it is contemplated that any number of the OTSs 96 of the network 90 could include the amplification assembly 100.

In this implementation, the amplification assembly 100 includes two amplifier stage assemblies 200 optically connected in series. As such the amplification assembly 100 may be referred to as a multi-stage amplification assembly 100. The amplification assembly 100 further includes a first signal splitter 112, a first photodetector 114, at least one signal Variable Optical Attenuator (VOA) 120, at least one gain flattening filter (GFF) 130, a second signal splitter 112, a second photodetector 144 and an automatic gain control (AGC) circuit 110 communicatively connected to the first photodetector 114, to the signal VOA 120, to the GFF 130, to the second photodetector 144 and to the two amplifier stage assemblies 200

In use, the first signal splitter 112 receives an input wavelength division multiplexing (WDM) signal, or simply an "input signal" (e.g. the optical signal 300) at a power input 102 of the amplification assembly 100. In this implementation, a first portion (e.g. 1 to 2%) of the input signal is directed to the first photodetector 114 optically connected to the first signal splitter 112. The AGC circuit 110 further determines an input signal power based on data provided by the first photodetector 114.

In parallel, a first amplifier stage assembly 200 optically connected to a second output of the first signal splitter 112 receives a second portion of the input signal (e.g. 98 to 99% thereof). The first amplifier stage assembly 200 will be described in more detail below with reference to FIG. 4. The signal VOA 120 further receives the optical signal from the first amplifier stage assembly 200 for the purpose of tuning an average gain level of the amplification assembly 100. The signal VOA 120 further transmits the optical signal to the gain flattening filter (GFF) 130 that is adapted to flatten the gain shape under the full-loading operating condition of the amplification assembly 100.

The optical signal is further transmitted from the GFF 130 to a second amplifier stage assembly 200 optically connected to the GFF 130. In this implementation, the first and second amplifier stage assemblies 200 have identical or similar features such that only the first amplifier stage assembly 200 will be described in FIG. 4. In this implementation, the amplification assembly 100 includes two amplifier stage assemblies 200. The amplification assembly 100 may include a different number of amplifier stage assemblies 200 in alternative implementations without departing from the scope of the present technology.

The second signal splitter 142 receives the optical signal from the second amplifier stage assembly 200 and transmits a first portion (e.g. 1 to 2%) of said optical signal to the second photodetector 144. A second portion (e.g. 98 to 99%) of said optical signal is transmitted to a power output 104 of the amplification assembly 100. In this implementation, the AGC circuit 110 determines an output signal power of the amplification assembly 100 based on data provided by the second photodetector 144.

The AGC circuit 110 also determines an average optical gain level of the amplification assembly 100 based on a comparison of data provided by the first and second photodetectors 114, 144. As such, by combining the information from the first and second photodetectors 114, 144, the averaged gain level of the amplification assembly 100 may be calculated. The AGC circuit 110 then performs an automatic gain control (AGC) process, by controlling driving currents of pump sources of the amplifier stage assemblies 200, as well as attenuation levels of the signal VOA 120 as it will be described in greater details herein after.

In this implementation, the AGC circuit 110 is implemented as a controller communicatively connected via any wired or wireless communication link to other components of the amplification assembly 100. How the communications between the AGC circuit 110 and other components of the amplification assembly 100 are implemented will depend inter alia on how the AGC circuit 110 and said components are implemented.

Figure 3:
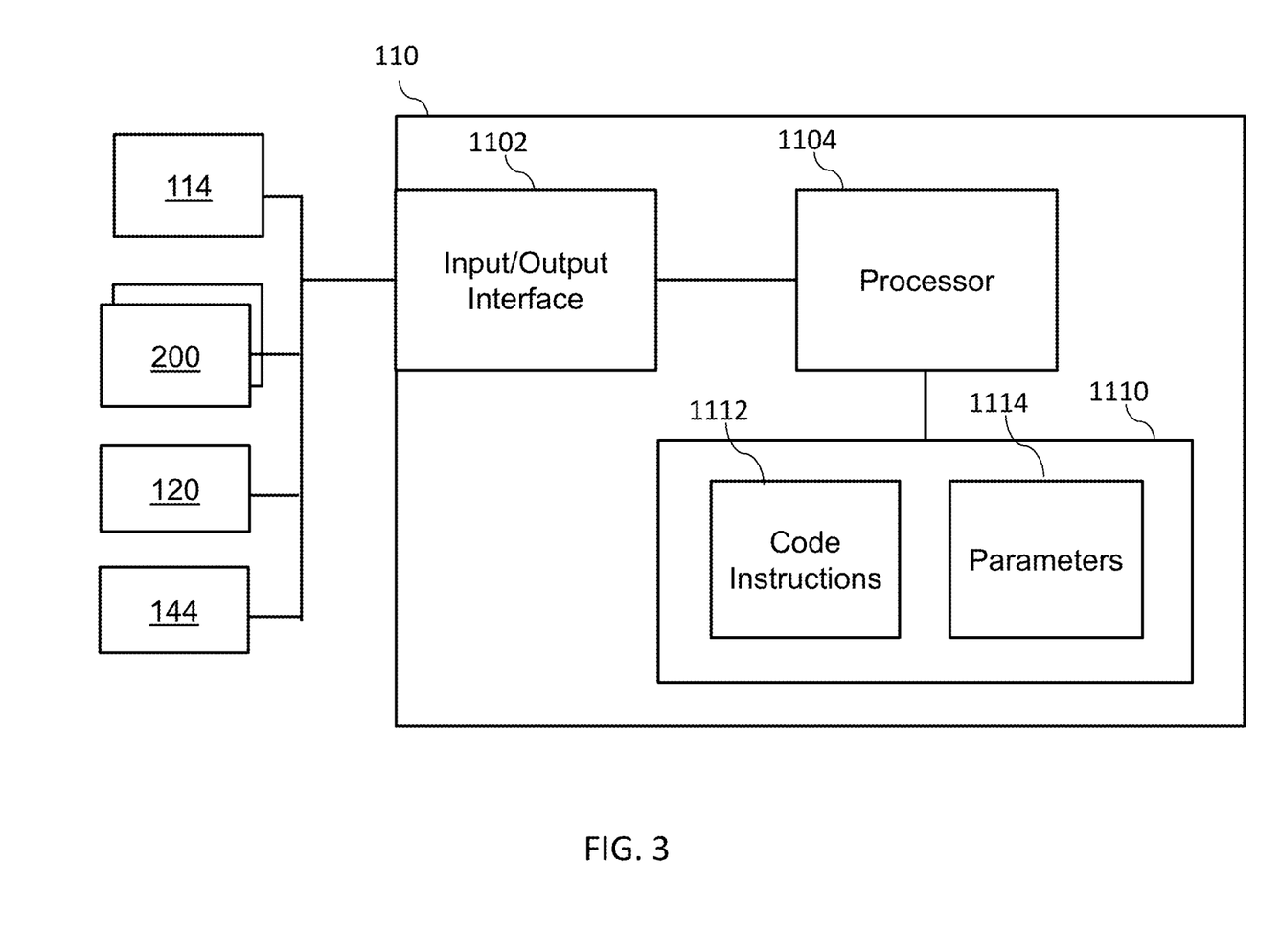
FIG. 3 is a block diagram of an automatic gain control circuit of the optical amplification assembly of FIG. 2.

As an example, FIG. 3 is a schematic block diagram of the AGC circuit 110 of the amplification assembly 100 according to one possible implementation of the present technology. The AGC circuit 110 includes a processor or a plurality of cooperating processors (represented as a processor 1104 for simplicity), a memory device or a plurality of memory devices (represented as a memory device 1110 for simplicity), and an input/output interface 1102 allowing the AGC circuit 110 to communicate with other components of the amplification assembly 100 and/or other components in remote communication with the amplification assembly 100. The processor 1104 is operatively connected to the memory device 1110 and to the input/output interface 1102. The memory device 1110 includes a storage for storing parameters 1114. The memory device 1110 may include a non-transitory computer-readable medium for storing code instructions 1112 that are executable by the processor 1104 to allow the AGC circuit 110 to perform the various tasks allocated to the AGC circuit 110 in the methods described in the present disclosure.

The AGC circuit 110 is operatively connected, via the input/output interface 1102, to the first and second photodetectors 114, 144, to the amplifier stage assemblies 200 and to the signal VOA 120. The AGC circuit 110 executes the code instructions 1112 stored in the memory device 1110 to implement the various functions described herein that may be present in a particular implementation. FIG. 3 as illustrated represents a non-limiting implementation in which the AGC circuit 110 orchestrates operations of the amplification assembly 100. This particular implementation is not meant to limit the present disclosure and is provided for illustration purposes. It will be appreciated that the processor 1104 and/or the AGC circuit 110 could be a server, a desktop computer, a laptop computer, a tablet, a smartphone, a personal digital assistant or any device that may be configured to implement the present technology, as should be understood by a person skilled in the art.

Figure 4:
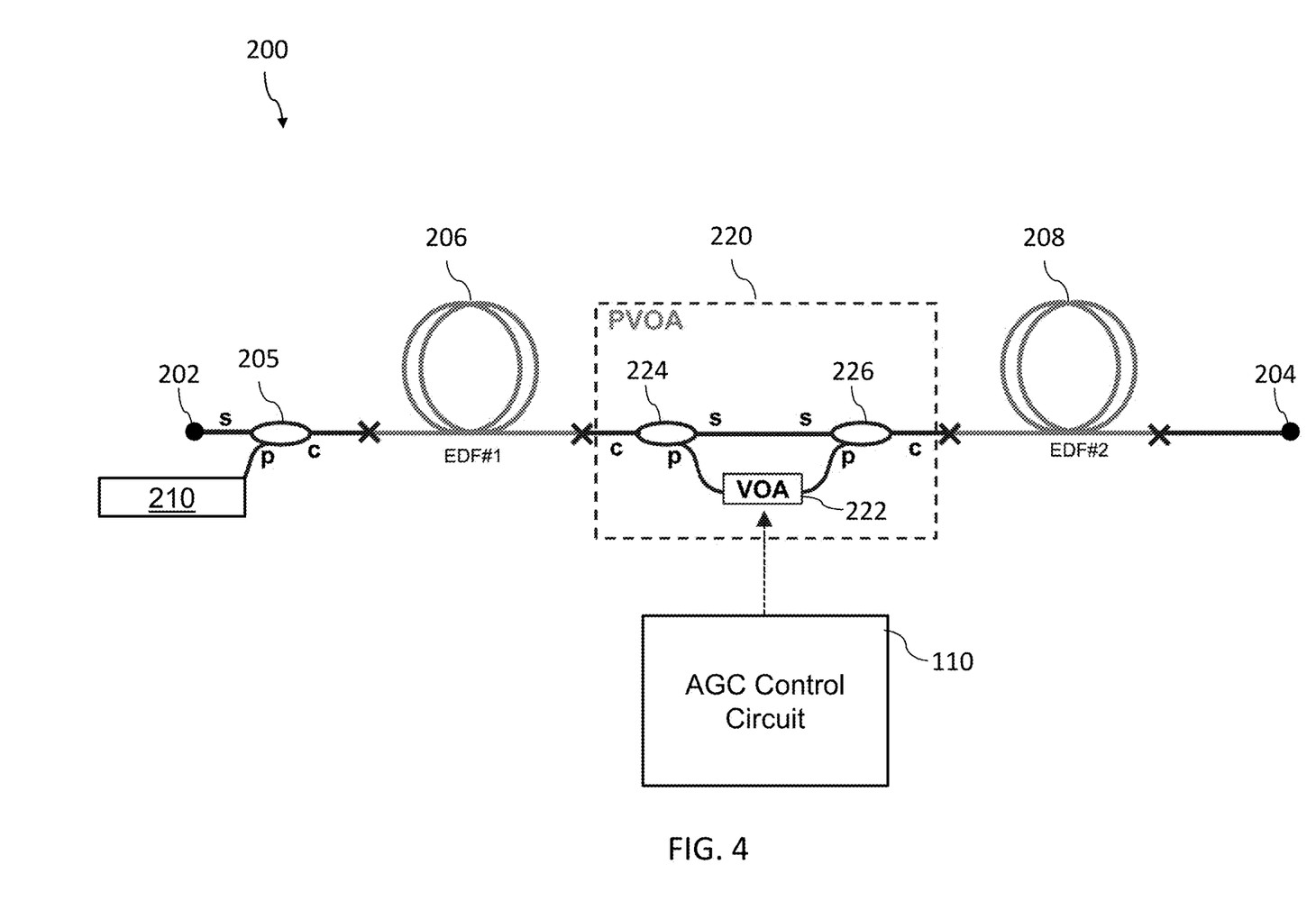
FIG. 4 is a high-level diagram of an amplifier stage assembly of the optical amplification assembly of FIG. 2, in accordance with some embodiments of the present technology.

With reference to FIG. 4, the amplifier stage assembly 200 receives the optical signal from the first signal splitter 112 at a power input 202. The amplifier stage assembly 200 includes a signal combiner 205, a pump source 210, a first doped fiber 206, a pump power variable attenuator (PVOA) 220 optically connected to the first doped fiber 206 and a second doped fiber 208 optically connected to the PVOA 220. In this implementation, the first and second doped fibers 206, 208 are erbium doped fibers.

In use, the optical signal to be amplified in the amplifier stage assembly 200 is combined with a signal generated by the pump source 210, or "optical pump signal", by the signal combiner 205 and further injected in the first doped fiber 206. In other words, the optical signal and the pump signal are multiplexed into the first doped fiber 206 such that the optical signal is amplified through interaction with the doping ions, thereby generating a first amplified signal. The pump source 210 may be, for example and without limitations, a single-mode semiconductor laser diode whose wavelength is located in the vicinity of 980 nm. As a person skilled in the art would understand, amplification is achieved by stimulated emission of photons from dopant ions in the first doped fiber 206.

In this implementation, the pump source 210 is also optically connected to the second doped fiber 208 such that the first amplified signal may be further amplified while through interaction with the doping ions of the second doped fiber 208.

The first amplified signal is further transmitted to the PVOA 220. More specifically, the PVOA 220 includes a first wavelength division multiplexing (WDM) coupler 224, a Variable Optical Attenuator (VOA) 222, and a second WDM 226, the VOA 222 being communicatively connected to the AGC circuit 110. In some implementations, the VOA 222 is formed by microelectromechanical systems (MEMS).

In use, the PVOA 220 applies variable attenuation to the optical pump signal, while being transparent to the signal wavelengths. In other words, the PVOA 220 does not modify a gain of the optical signal. When the pump power injected into second doped fiber 208 is strong enough (e.g. above 10 mW), the second doped fiber 208 operates with SHB effect. On the other hand, when the optical pump signal is sufficiently low (e.g. below 10 mW), the second doped fiber 208 operates with inverse SHB effect. Generally, it should be understood that the doped fibers that operate with inverse SHB effect adaptively compensate the gain shape deformation that is generated within the doped fibers that operate with SHB effect.

Figure 10:
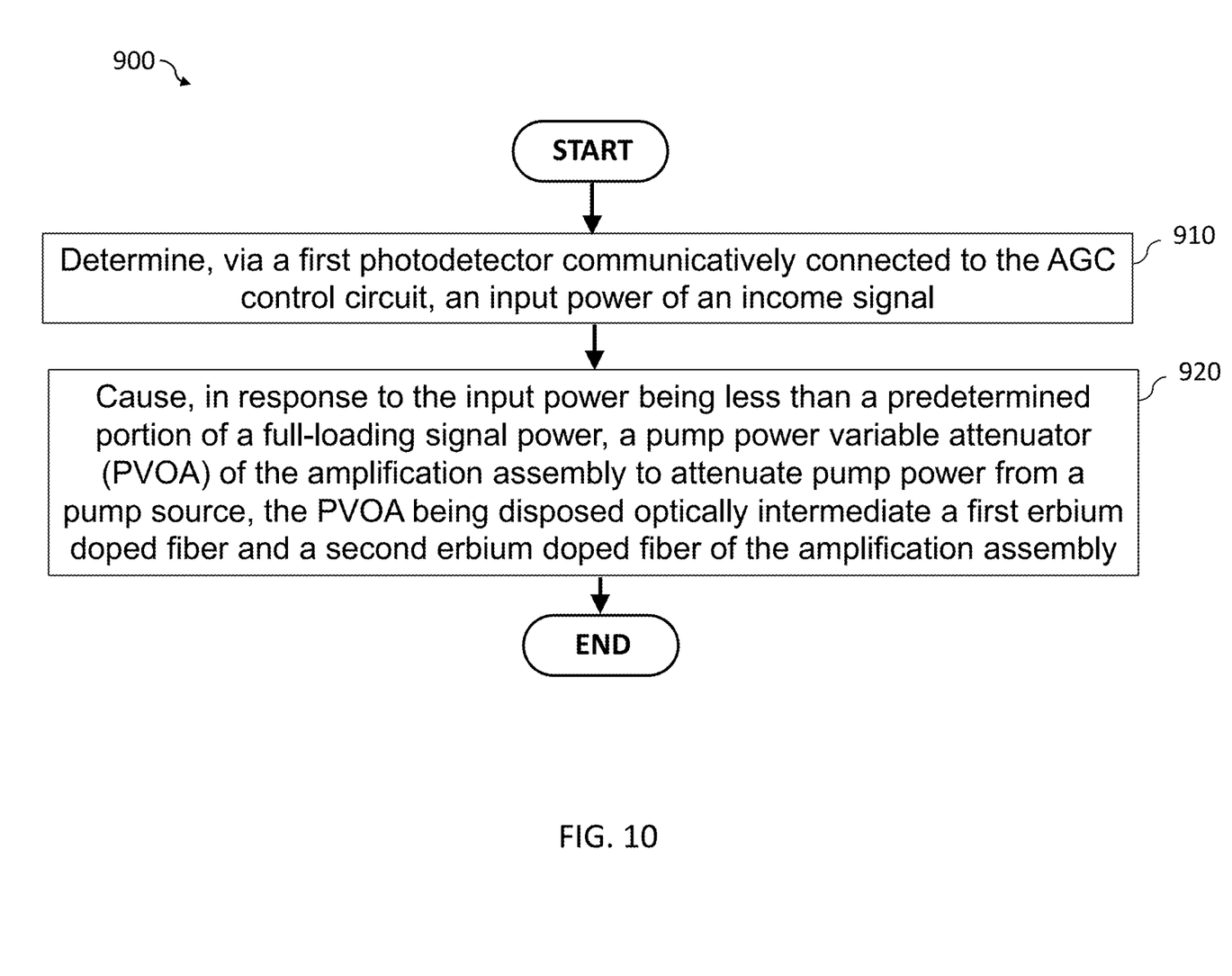
FIG. 10 is a flow diagram showing operations of a method for managing spectral hole burning (SHB) effect in the OTN link of FIG. 1, in accordance with some implementations of the present technology.

In this implementation, the PVOA 220 is employed by the AGC circuit 110, upon the AGC circuit 110 executing the AGC process, to manage pump illumination provided to the second doped fiber 208 from the pump source 210. While a method 900 for utilizing the amplification assembly 100 will be described in greater detail below with reference to FIG. 10, the operation of the assembly 100 is generally performed as follows. In use, in response to the AGC circuit 110 determining that the input signal allocation is close to the condition of full-loading (i.e. when the AGC circuit 110 determines that, based on data provided by the first photodetector 114, optical power of the optical signal at the power input is above a pre-determined threshold, the AGC circuit 110 sets the PVOA 220 to be transparent to the optical pump signal. All the doped fibers of the amplifier stage assembly 200 operate in the normal amplification status and with SHB effect. Since the amplifier stage assembly 200 operates in the full-loading operating condition, the gain shape deformation accumulated in the doped fibers is compensated by the GFF and the overall gain shape deformation at the output port of the amplifier is negligible. In this implementation, the pre-determined threshold is based on expected signal power in the full-loading operating condition. For example, the pre-determined threshold may be set to 50% of the full-loading signal power (i.e. the expected optical power of the optical signal when the amplifier stage assembly 200 operates in the full-loading operating condition).

In this implementation, in response to the AGC circuit 110 determining that the amplifier stage assembly 200 operates in few-channel-loading operating condition (i.e. when the AGC circuit 110 determines that, based on data provided by the first photodetector 114, optical power of the optical signal at the power input is below the pre-determined threshold), the AGC circuit 110 activates the PVOA 220 to induce large attenuation to the optical pump signal. In this case, the doped fibers that are placed after the PVOA 220 (i.e. the second doped fiber 208) will be low-power-pumped or even un-pumped (i.e. optical power of the optical pump signal in the second doped fiber 208 below 10 mW). The doped fibers that are placed after the PVOA 220 thus operate in the region of inverse SHB and compensate the SHB gain holes generated in the other doped fibers. In this implementation, the AGC circuit 110 further adjusts the driving currents of the pump diodes so that the average gain level of the amplifier can be locked at a given set point.

Figure 5:
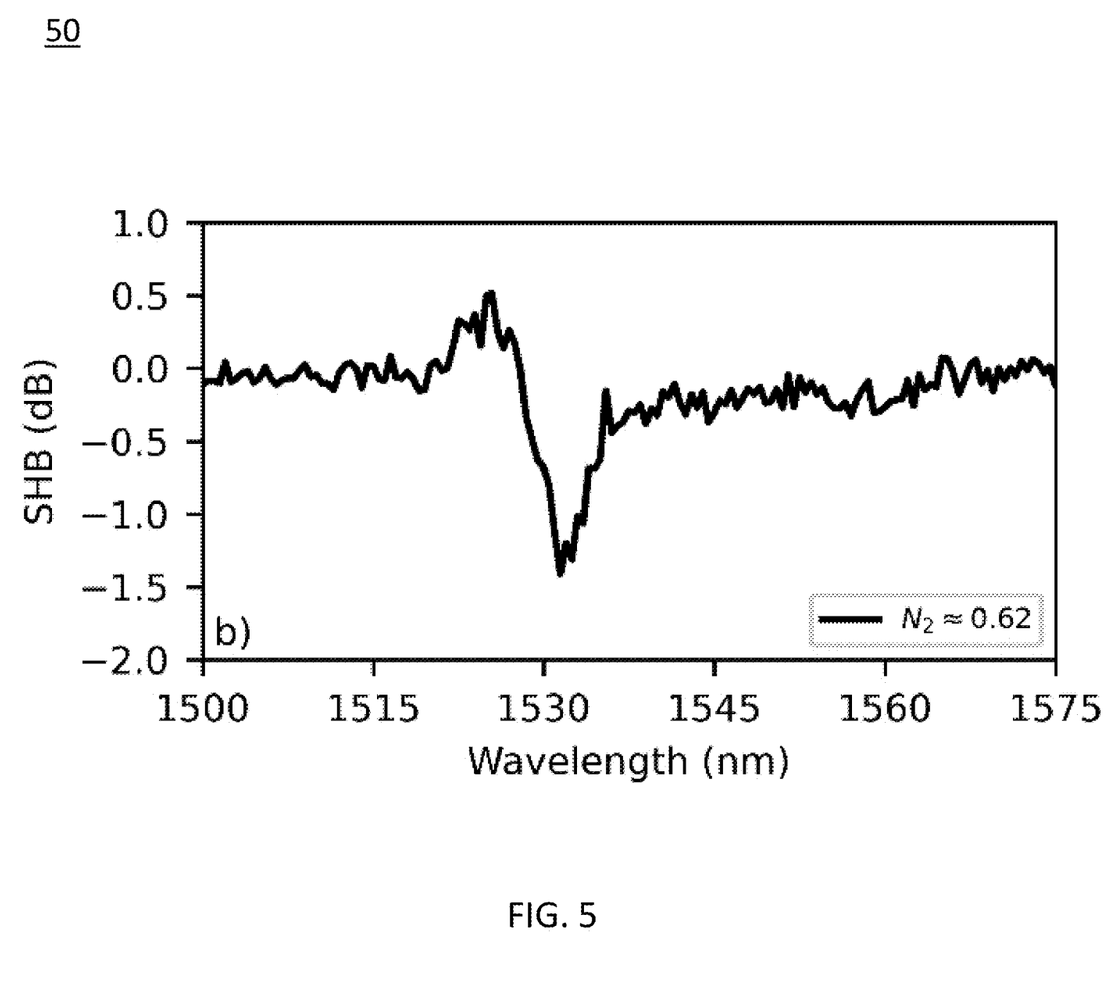
FIG. 5 is a graph of a gain shape deformation according to a wavelength of the optical signal obtained when no SHB compensation is executed by the amplification assembly of FIG. 2.
Figure 6:
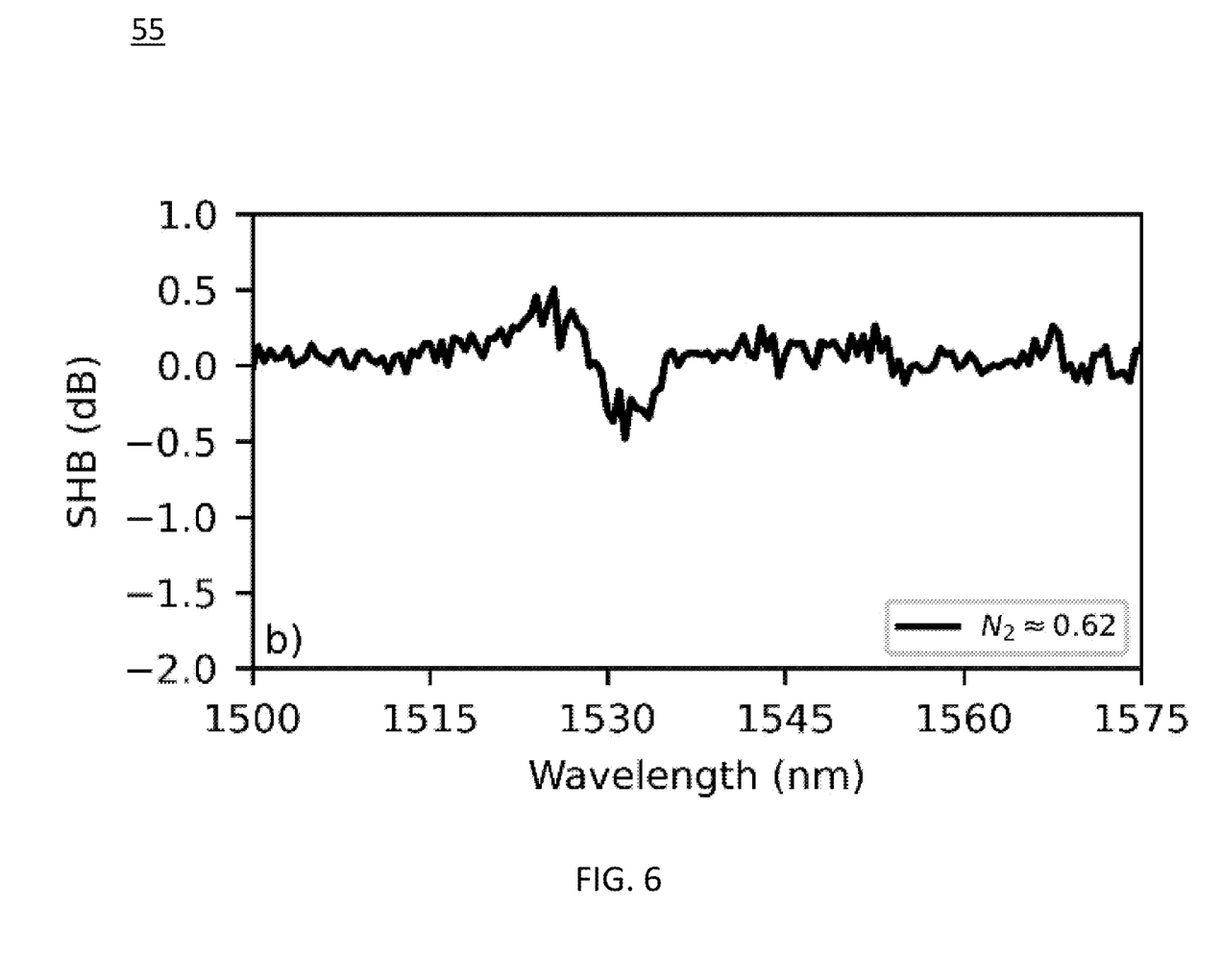
FIG. 6 is a graph of a gain shape deformation according to a wavelength of the optical signal obtained with the optical amplification assembly of FIG. 2 when SHB compensation is executed.
Figure 7:
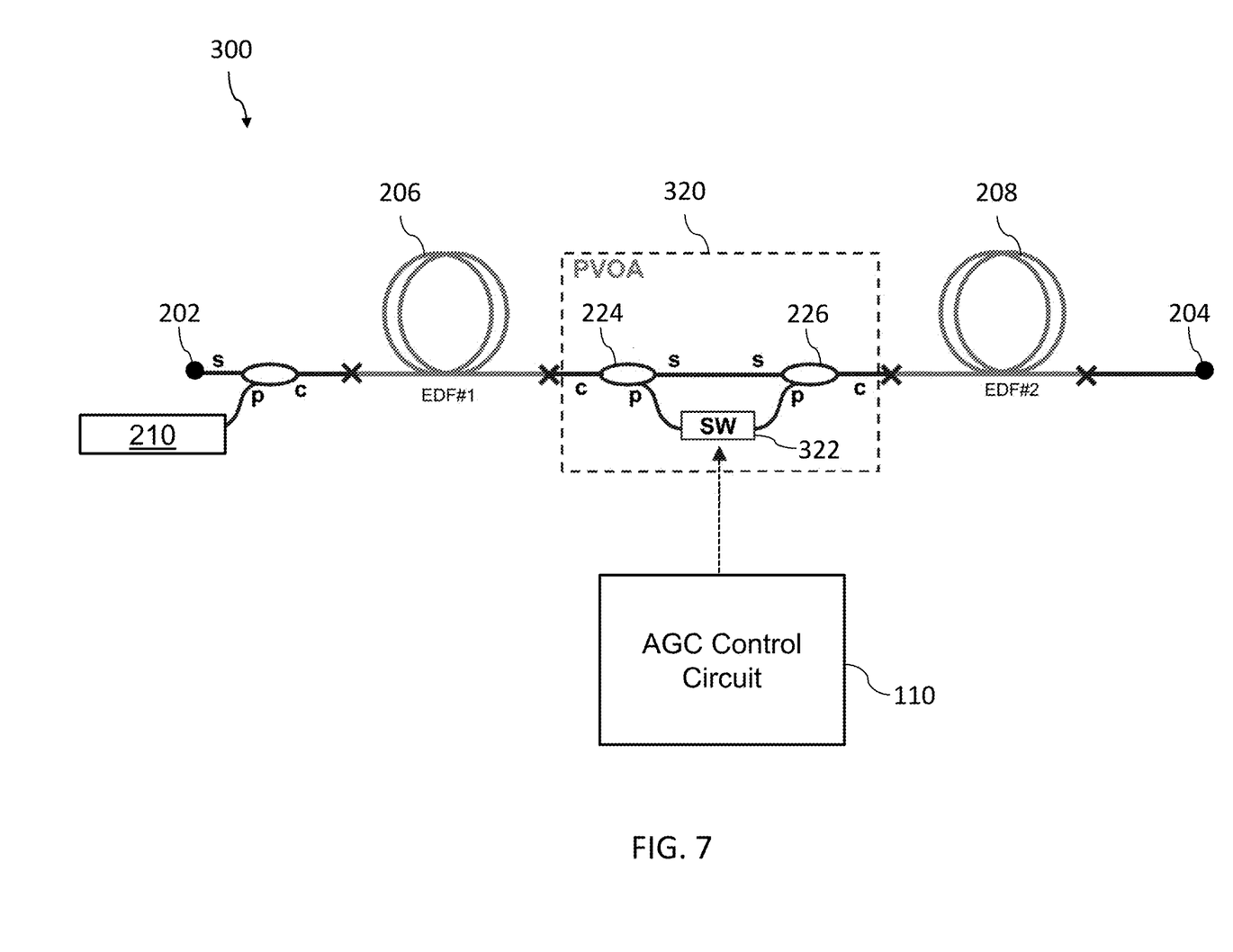
FIG. 7 is a high-level diagram of another amplifier stage assembly of the optical amplification assembly of FIG. 2, in accordance with some embodiments of the present technology.

Experimental measurements have been conducted to determine an effect of the present technology on the SHB effect. With reference to FIG. 5, there is shown a gain shape deformation (i.e. the SHB spectrum) measured when no SHB compensation is executed by the amplification assembly 100. More specifically, to obtain the graph of FIG. 5, two optical signals are injected into the amplifier stage assembly 200 of FIG. 4 via the power inlet 202. One optical signal is fixed at 1532 nm with relatively strong power (several tens of mW). Another optical signal is a low power (below −35 dBm) wavelength swept laser that is used for the measurement of the gain shape deformation. This signal channel allocation corresponds to an extreme case of SHB. When the PVOA 220 is tuned to induce no attenuation to the pump power, the setup is working under a mode without SHB compensation. When the PVOA 220 is tuned to induce large attenuation (above 20 dB) to the pump light, the setup is then working under a mode of with SHB compensation. The averaged Er$^+$ inversion level (denoted as N$_2$, which is equivalent to the level of gain compression) is set to be identical for the cases of both with and without SHB compensation. FIG. 5 shows the gain shape deformation measured under the mode of without SHB compensation. It can be seen that the SHB depth is ~1.5 dB at 1532 nm. FIG. 6 shows the gain shape deformation measured with SHB compensation, according to an embodiment of the present technology. The gain shape deformation is significantly reduced. For example, the gain depth at 1532 nm is reduced to below 0.5 dB. In addition, it can also be clearly seen that the gain shape deformations at other wavelengths are also reduced. In conclusion, more than 60% of the SHB-induced gain deformation can be compensated in this illustrative example.

Another implementation of an amplifier stage assembly 300 according to the present technology is illustrated in FIG. 6. Elements of the amplifier stage assembly 300 that are similar to those of the amplifier stage assembly 200 retain the same reference numeral and will generally not be described again. In this implementation, the amplifier stage assembly 300 includes a PVOA 320 including the WDM coupler 224, an optical switch 322 optically connected to the first WDM coupler 224, the optical switch 322 being communicatively connected to the AGC circuit 110, and the second WDM 226 optically connected to the optical switch 322. Since the inverse SHB happens when the second doped fiber 208 is low-power-pumped or un-pumped, the optical switch 322 has the similar functionality as a VOA 222 for the purpose of activating the inverse SHB effect.

Figure 8:
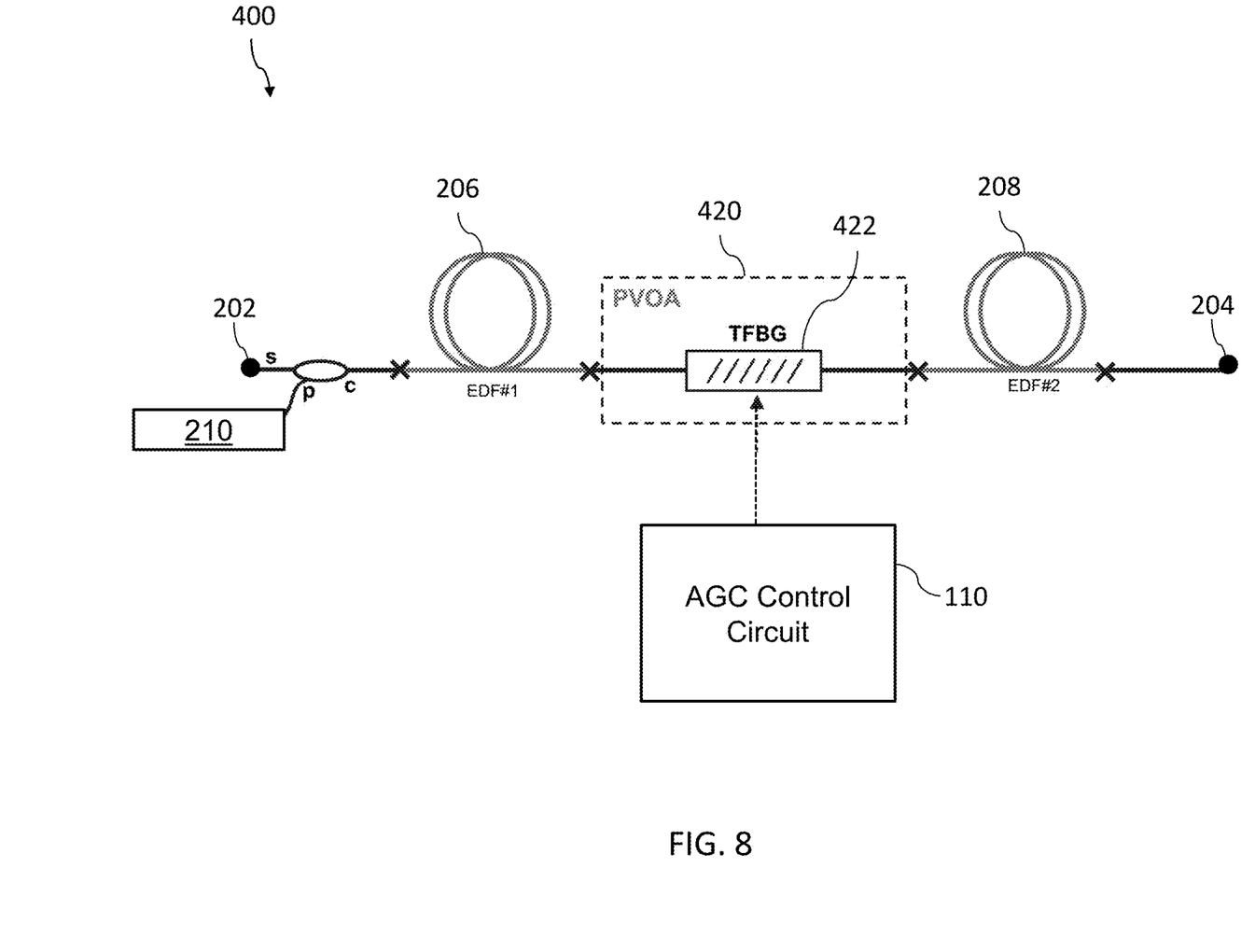
FIG. 8 is a high-level diagram of yet another amplifier stage assembly of the optical amplification assembly of FIG. 2, in accordance with some embodiments of the present technology.

Yet another implementation of an amplifier stage assembly 400 according to the present technology is illustrated in FIG. 8. Elements of the amplifier stage assembly 400 that are similar to those of the amplifier stage assembly 200 retain the same reference numeral and will generally not be described again. In this implementation, the amplifier stage assembly 400 includes a PVOA 420 including a tilted fiber Bragg grating (TFBG) 422 operatively connected to the AGC circuit 110.

In use, the TFBG 422 strips the optical pump signal, or "pump light", out from a core area of an optical fiber of the OTN link 90 into a cladding area thereof. The pump light in the cladding area thus leaks out via a high index polymer coating of the optical fiber of the OTN link 90. As such, the TFBG 422 only impacts optical wavelengths that are located in the vicinity of the TFBG's resonant wavelength. The TFBG 422 is therefore transparent to the wavelengths of the optical signal 300. The AGC circuit 110 applies and adjusts an electrical signal on top of the TFBG 422 and, due to a thermal effect of the electrical signal, a center wavelength of the resonant region of the TFBG 422 may be shifted. As a result, the pump light will not be impacted and will be injected into second doped fiber 208.

Yet another implementation of an amplifier stage assembly 500 according to the present technology is illustrated in FIG. 8. Elements of the amplifier stage assembly 500 that are similar to those of the amplifier stage assembly 200 retain the same reference numeral and will generally not be described again. In this implementation, the amplifier stage assembly 400 includes a PVOA 520 including a fiber Bragg grating (FBG) 522 operatively connected to the AGC circuit 110. The FBG 522 has a center wavelength which can be tuned by application of an electrical signal to the FBG 522 by the AGC circuit 110. When there is no signal applied, the resonance wavelength of the FBG 522 does not superimpose with both the pump light and the optical signal 300. When there is an electrical signal applied to the FBG 522, due to the thermal effect, the resonance wavelength of the FBG 522 will shift and will superimpose with the wavelength of the optical pump signal. In this case, the optical pump signal will be reflected back into first doped fiber 206 to enhance the gain in first doped fiber 206, while the second doped fiber 208 will be low power pumped or even un-pumped so as to activate the inverse SHB effect.

Figure 9:
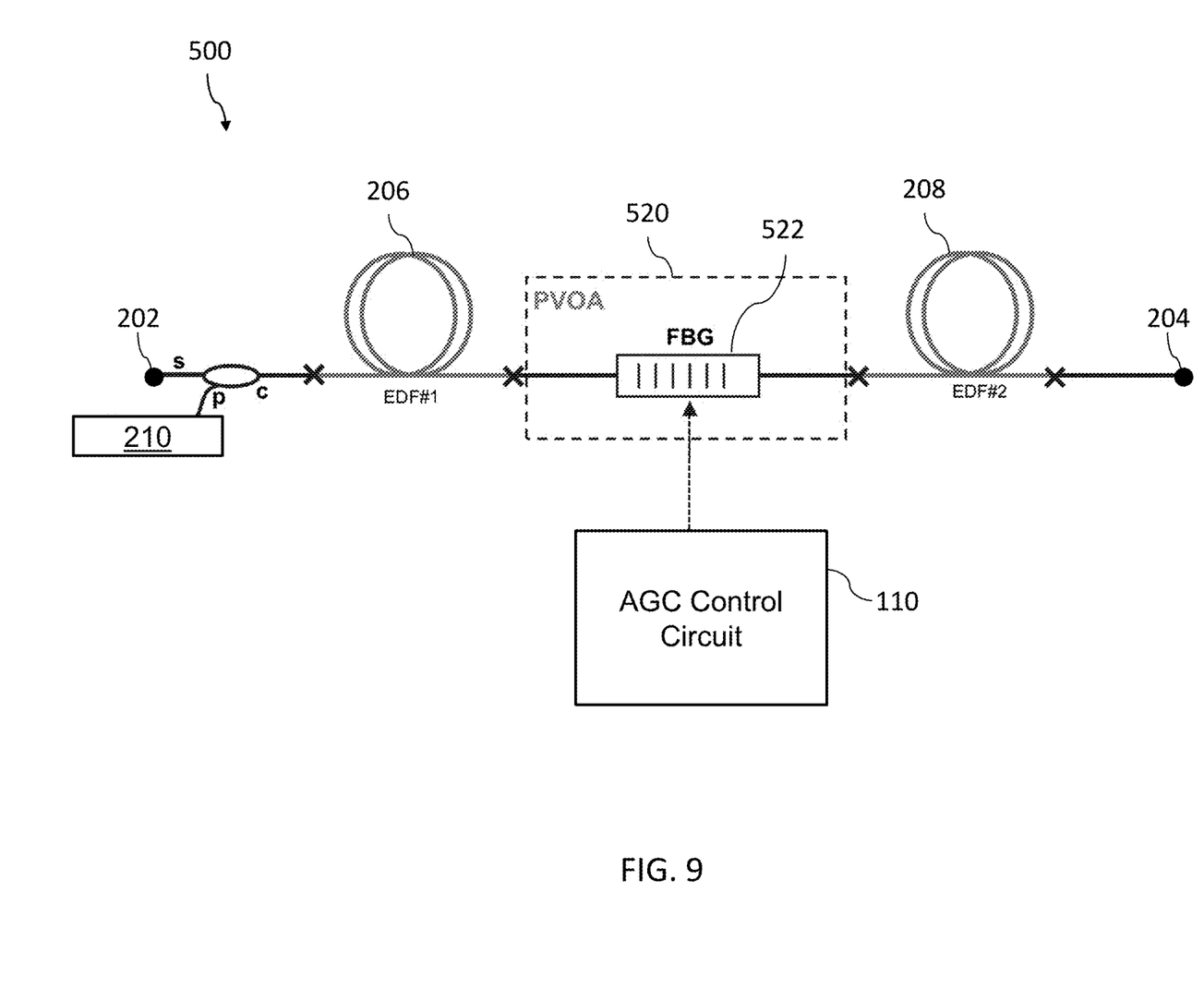
FIG. 9 is a high-level diagram of yet another amplifier stage assembly of the optical amplification assembly of FIG. 2, in accordance with some embodiments of the present technology.

With reference to FIG. 9, a method 900 for managing spectral hole burning (SHB) effect in the optical transport network (OTN) link 90 using the amplification assembly 100 described above will now be described. The method 900 is described below as performed by the AGC circuit 110, but in some implementations, it is contemplated that the method 900 could be performed by a separate processor or controller.

The method 900 begins, at step 910, with determining, via the first photodetector 114 communicatively connected to the AGC circuit 110, an input power of the incoming optical signal 300 at the power input 102 of the amplification assembly 100.

The method 900 continues, at step 920, with causing, in response to the input power being less than a predetermined threshold, the pump power variable attenuator (PVOA) 220 of the amplification assembly 100 to attenuate pump power from the pump source 202, the PVOA 220 being disposed optically intermediate the first doped fiber 206 and the second doped fiber 208. In this embodiment, the first and second doped fibers 206, 208 are Erbium doped fibers.

In this implementation, the pre-determined threshold is based on a full-loading signal power. For example, the pre-determined threshold may be half of the full-loading signal power (i.e. half of the expected optical power of the optical signal 300 when the amplification assembly 100 operates in the full-loading operating condition).

In the illustrated embodiment, causing the PVOA 220 of the amplification assembly 100 to attenuate pump power from a pump source includes operating the variable optical attenuator (VOA) 222 optically intermediate the two wavelength division multiplexing (WDM) couplers 224, 226.

In some alternative implementations, the PVOA 220 may be replaced by the PVOA 320, the PVOA 420, or the PVOA 520. More specifically, in some implementations, causing the pump power variable attenuator to attenuate pump power from a pump source may include actuating the optical switch 322 optically intermediate the two wavelength division multiplexing (WDM) couplers 224, 226. In some other implementations, causing the pump power variable attenuator to attenuate pump power from a pump source may include applying an electrical current to the tilted fiber Bragg grating (TFBG) 422 optically intermediate the first and second doped fibers 206, 208. In yet some other implementations, causing the pump power variable attenuator to attenuate pump power from a pump source may include applying an electrical current to the fiber Bragg grating (FBG) 422 optically intermediate the first and second doped fibers 206, 208.

In some non-limiting implementations, the method 900 could terminate with determining, via the second photodetector 144 communicatively connected to the AGC circuit 110, an output power of an output signal at the power output 104 of the amplification assembly 100 and controlling, based at least in part on the output power of the output signal, a driving current of the pump source 202 to manage an average gain level of the amplification assembly 100.

While the above-described implementations have been described and shown with reference to particular operations performed in a particular order, it will be understood that these steps may be combined, sub-divided, or re-ordered without departing from the teachings of the present technology. At least some of the steps may be executed in parallel or in series. Accordingly, the order and grouping of the steps is not a limitation of the present technology.

It is to be understood that the operations and functionality of systems 100, 200, constituent components, and associated processes may be achieved by any one or more of hardware-based, software-based, and firmware-based elements. Such operational alternatives do not, in any way, limit the scope of the present disclosure.

It will also be understood that, although the implementations presented herein have been described with reference to specific features and structures, it is clear that various modifications and combinations may be made without departing from such disclosures. The specification and drawings are, accordingly, to be regarded simply as an illustration of the discussed embodiments or implementations and their principles as defined by the appended claims, and are contemplated to cover any and all modifications, variations, combinations or equivalents that fall within the scope of the present disclosure.

What is claimed is:

1. An amplification assembly for an optical transport network (OTN) link, the amplification assembly comprising:
    an automatic gain control (AGC) circuit;
    a first signal splitter configured for receiving an input wavelength division multiplexing (WDM) signal;
    a first photodetector optically connected to a first output of the first signal splitter, the first photodetector being communicatively connected to the AGC circuit, the AGC circuit and the first photodetector being configured to determine an input signal power;
    a first amplifier stage assembly optically connected to a second output of the first signal splitter, the first amplifier stage assembly being communicatively connected to the AGC circuit;
    at least one signal variable optical attenuator (VOA) optically connected to the first amplifier stage;
    at least one gain flattening filter (GFF) optically connected to the at least one signal VOA;
    a second amplifier stage assembly optically connected to the at least one GFF, the second amplifier stage assembly being communicatively connected to the AGC circuit;
    a second signal splitter optically connected to the second amplifier stage assembly, the second signal splitter being configured for transmitting an output WDM signal from a first output of the second signal splitter; and
    a second photodetector optically connected to a second output of the second signal splitter, the second photodetector being communicatively connected to the AGC circuit, the AGC circuit and the second photodetector being configured to determine an output signal power,
    at least one of the first amplifier stage assembly and the second amplifier stage assembly comprising:
        a first doped fiber;
        a pump power variable attenuator (PVOA) optically connected to the first doped fiber;
        a second doped fiber optically connected to the PVOA; and
        a pump source optically connected to the first doped fiber and the second doped fiber, the PVOA being configured to manage pump illumination provided to the second doped fiber from the pump source, the PVOA being configured to apply a pre-determined value when input signal power is lower than a threshold, the PVOA being disposed optically intermediate the first doped fiber and the second doped fiber.

2. The amplification assembly of claim 1, wherein the first and second doped fibers are Erbium doped fibers.

3. The amplification assembly of claim 1, wherein the PVOA of the at least one of the first amplifier stage assembly and the second amplifier stage assembly comprises:
    a first wavelength division multiplexing (WDM) coupler;
    a variable optical attenuator (VOA) optically connected to the first WDM coupler, the VOA being communicatively connected to the AGC circuit; and
    a second WDM coupler optically connected to the VOA.

4. The amplification assembly of claim 1, wherein the PVOA of the at least one of the first amplifier stage assembly and the second amplifier stage assembly comprises:
    a first wavelength division multiplexing (WDM) coupler;
    an optical switch (SW) optically connected to the first WDM coupler, the optical switch being communicatively connected to the AGC circuit; and
    a second WDM coupler optically connected to the SW.

5. The amplification assembly of claim 1, wherein the PVOA of the at least one of the first amplifier stage assembly and the second amplifier stage assembly comprises:
    a tilted fiber Bragg grating (TFBG) operatively connected to the AGC circuit.

6. The amplification assembly of claim 1, wherein the PVOA of the at least one of the first amplifier stage assembly and the second amplifier stage assembly comprises:
    a fiber Bragg grating (FBG) operatively connected to the AGC circuit, a center wavelength of the FBG being electrically tunable.

7. The amplification assembly of claim 1, wherein an other one of the first amplifier stage assembly and the second amplifier stage assembly comprises:
    a third doped fiber;
    an other pump power variable attenuator (PVOA) optically connected to the third doped fiber;
    a fourth doped fiber optically connected to the other PVOA; and
    an other pump source optically connected to the third doped fiber and the fourth doped fiber,
    the other PVOA being configured to manage pump illumination provided to the second from the pump source.

8. The amplification assembly of claim 7, wherein the third and fourth doped fibers are Erbium doped fibers.

9. A method for managing spectral hole burning (SHB) effect in an optical transport network (OTN) link, the method being performed by an automatic gain control (AGC) circuit of an amplification assembly of claim 1, the method comprising:
    determining, via the first photodetector communicatively connected to the AGC circuit, input signal power of an incoming signal; and
    in response to the input power being less than a predetermined portion of a full-loading signal power, causing the pump power variable attenuator (PVOA) of the amplification assembly to attenuate pump power from the pump source, the PVOA being disposed optically intermediate the first doped fiber and the second doped fiber.

10. The method of claim 9, wherein the first and second doped fibers are Erbium doped fibers.

11. The method of claim 9, wherein the predetermined portion of the full-loading signal power is half of the full-loading signal power.

12. The method of claim 9, further comprising:
determining, via the second photodetector communicatively connected to the AGC circuit, the output signal power of an output signal; and
controlling, based at least in part on the output power of the output signal, a driving current of the pump source to manage an average gain level of the amplification assembly.

13. The method of claim 9, wherein causing the pump power variable attenuator (PVOA) of the amplification assembly to attenuate pump power from the pump source comprises:
operating a variable optical attenuator optically intermediate two wavelength division multiplexing (WDM) couplers.

14. The method of claim 9, wherein causing the pump power variable attenuator (PVOA) of the amplification assembly to attenuate pump power from the pump source comprises:
actuating an optical switch optically intermediate two wavelength division multiplexing (WDM) couplers.

15. The method of claim 9, wherein causing the pump power variable attenuator (PVOA) of the amplification assembly to attenuate pump power from the pump source comprises:
applying an electrical current to a tilted fiber Bragg grating (TFBG) optically intermediate the first and second doped fibers.

16. The method of claim 9, wherein causing the pump power variable attenuator (PVOA) of the amplification assembly to attenuate pump power from the pump source comprises:
applying an electrical current to a fiber Bragg grating (FBG) optically intermediate the first and second doped fibers.

17. The amplification assembly of claim 1, wherein:
the AGC circuit is further configured to:
determine an average optical gain level of the amplification assembly based on data provided by the first photodetector and the second photodetector; and
control driving currents of pump sources of the amplifier stage assembly and the attenuation levels of the signal VOA.

* * * * *